(12) United States Patent
Grolimund

(10) Patent No.: US 9,079,259 B2
(45) Date of Patent: Jul. 14, 2015

(54) SAW BLADE

(75) Inventor: Daniel Grolimund, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 13/695,893

(22) PCT Filed: Mar. 9, 2011

(86) PCT No.: PCT/EP2011/053505
§ 371 (c)(1),
(2), (4) Date: Feb. 15, 2013

(87) PCT Pub. No.: WO2011/138064
PCT Pub. Date: Nov. 10, 2011

(65) Prior Publication Data
US 2013/0133502 A1    May 30, 2013

(30) Foreign Application Priority Data

May 7, 2010    (DE) .......................... 10 2010 028 748

(51) Int. Cl.
| | | |
|---|---|---|
| *B23D 63/12* | (2006.01) | |
| *B23D 61/14* | (2006.01) | |
| *B23D 61/12* | (2006.01) | |
| *B23D 61/02* | (2006.01) | |

(52) U.S. Cl.
CPC .............. *B23D 61/14* (2013.01); *B23D 61/021* (2013.01); *B23D 61/121* (2013.01)

(58) Field of Classification Search
CPC ........................... B23D 61/021; B23D 61/121
USPC ..................... 83/835–855; 30/349, 355, 350
See application file for complete search history.

(56) References Cited

U.S. PATENT DOCUMENTS

| | | | |
|---|---|---|---|
| 4,203,215 A * | 5/1980 | Ochiai et al. .................... 30/383 |
| 4,640,172 A | 2/1987 | Kullmann et al. | |
| 5,868,058 A * | 2/1999 | Senegas .......................... 83/846 |
| 6,003,422 A | 12/1999 | Holston | |
| 6,119,571 A | 9/2000 | Hayden, Sr. | |
| 7,210,388 B2 * | 5/2007 | Pacher et al. .................. 83/835 |
| 2002/0148340 A1 | 10/2002 | Tsujimoto | |
| 2006/0065098 A1 | 3/2006 | Cranna | |
| 2006/0130341 A1* | 6/2006 | Burry et al. ................. 30/166.3 |

(Continued)

FOREIGN PATENT DOCUMENTS

| | | |
|---|---|---|
| CN | 1278474 A | 1/2001 |
| CN | 2582803 Y | 10/2003 |

(Continued)

OTHER PUBLICATIONS

International Search Report corresponding to PCT Application No. PCT/EP2011/053505, mailed Jun. 16, 2011 (German and English language document) (6 pages).

*Primary Examiner* — Ned Landrum
*Assistant Examiner* — Richard Crosby, Jr.
(74) *Attorney, Agent, or Firm* — Maginot, Moore & Beck LLP

(57) ABSTRACT

A saw blade includes saw teeth arranged along a toothed side. The saw teeth have a pitch that increases from a clamped end of the saw blade to a saw blade tip. The saw teeth include a tooth support and a hard metal tooth joined to the tooth support. The saw teeth have a plurality of tooth supports having the same shape. Larger tooth spaces are provided for the increasing pitch between tooth supports having an identical shape.

15 Claims, 1 Drawing Sheet

(56) References Cited

U.S. PATENT DOCUMENTS

| | | | |
|---|---|---|---|
| 2006/0130630 A1* | 6/2006 | Hesselberg et al. | 83/835 |
| 2007/0180972 A1* | 8/2007 | Lowder et al. | 83/835 |
| 2007/0193427 A1* | 8/2007 | Hayden, Sr. | 83/788 |
| 2008/0121079 A1* | 5/2008 | Hashimoto et al. | 83/14 |
| 2009/0013847 A1* | 1/2009 | Lauzet | 83/846 |
| 2009/0199693 A1* | 8/2009 | Heyen | 83/835 |
| 2009/0293698 A1* | 12/2009 | Tran et al. | 83/846 |
| 2010/0175532 A1* | 7/2010 | Evatt et al. | 83/835 |
| 2012/0090443 A1* | 4/2012 | Butzen et al. | 83/849 |

FOREIGN PATENT DOCUMENTS

| | | |
|---|---|---|
| CN | 1608776 A | 4/2005 |
| CN | 1729074 A | 2/2006 |
| DE | 297 03 232 U1 | 10/1998 |
| DE | 203 16 149 U1 | 3/2005 |
| EP | 0 318 445 A1 | 5/1989 |
| FR | 964 651 A | 8/1950 |

* cited by examiner

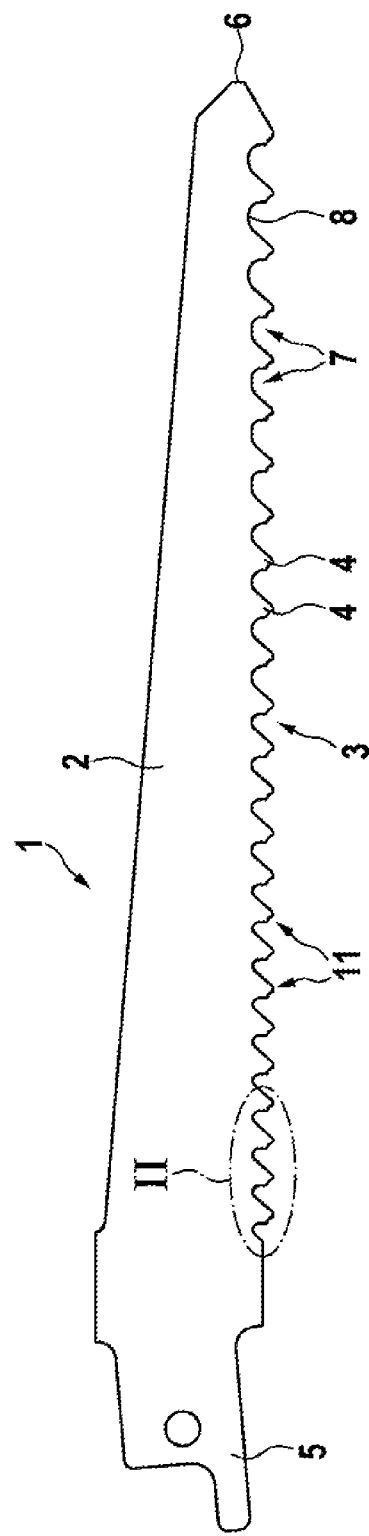
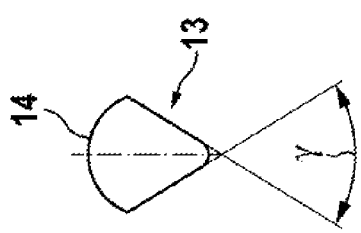
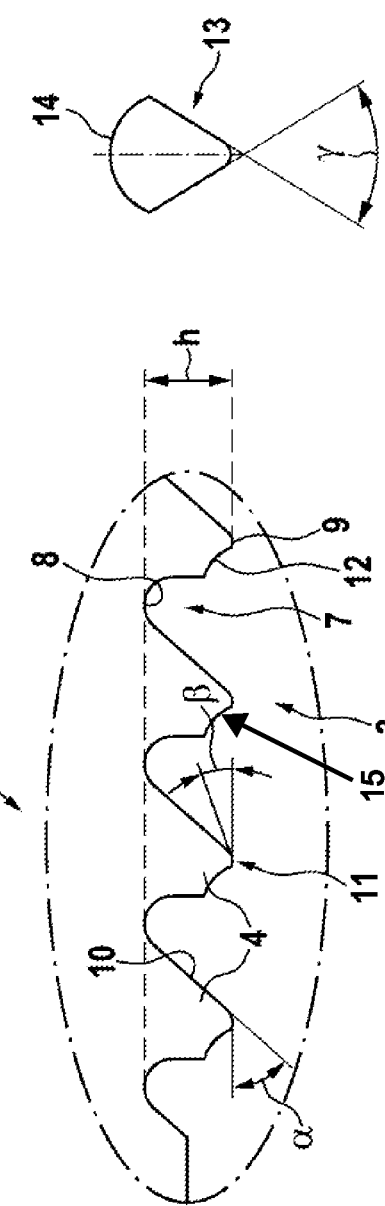

SAW BLADE

This application is a 35 U.S.C. §371 National Stage Application of PCT/EP2011/053505, filed on Mar. 9, 2011, which claims the benefit of priority to Serial No. DE 10 2010 028 748.2, filed on May 7, 2010 in Germany, the disclosures of which are incorporated herein by reference in their entirety.

BACKGROUND

The disclosure relates to a saw blade having saw teeth located in a row.

DE 203 16 149 U1 makes known a jigsaw blade for a jigsaw, wherein the jigsaw blade has a clamping end for fastening in the machine tool and a plurality of saw teeth are arranged between the clamping end and the saw blade tip on a toothed side. The jigsaw blade has an increasing pitch from the clamping end to the saw blade tip, where the size of both the saw teeth and of the tooth gaps located in between increases. The saw teeth, in this connection, are ordered into groups, wherein inside one group the saw teeth and the tooth gaps located in between have the identical geometry and the pitch increases from group to group.

DE 297 03 232 U1 makes known a jigsaw blade with a progressively ascending tooth pitch where the small saw teeth are arranged close to the clamping end and the larger teeth are arranged close to the saw blade tip.

Over and above this, it is known to provide saw blades with hard metal teeth, which are preferably used when abrasive materials are worked with. The joining between the saw blade and the hard metal teeth is effected, for example, by means of resistance welding.

SUMMARY

The object underlying the disclosure is to execute a saw blade in a structural manner such that hard metal teeth can be joined to the saw blade in a simple manner and with a high level of workmanship.

The saw blade according to the disclosure, which is used in particular in manually operated, electric motor driven hacksaws, has a toothed side on which a plurality of saw teeth are arranged located in a row. Proceeding from the clamping end, by means of which the saw blade is clamped in the machine tool, the saw teeth have an increasing pitch toward the saw blade tip where the space between the saw teeth increases. Each saw tooth of the saw blade consists of a tooth support, which is realized in one piece with the saw blade, and a hard metal tooth which is realized as a separate component and is joined to the tooth support, in particular by means of welding or by means of soldering. For example, resistance welding or brazing can be considered.

The saw blade has several tooth supports which have the same geometry shape and size, wherein, in spite of the constant geometry, there is a pitch which increases in the axial direction of the saw blade and is realized as a result of there being larger tooth gaps between the tooth supports with identical geometry. In contrast to the prior art, the changing pitch is consequently realized exclusively by means of differently sized tooth gaps and not by means of a change in the size or the geometry of the tooth support. The advantage of this is that the energy input, which is necessary for the respective type of joining between the hard metal teeth and the tooth support, is identical per tooth for the relevant group of tooth supports of identical size or geometry. This makes it considerably simpler to produce the saw blade. In addition, the quality of the joining is kept the same over the relevant group of teeth. In the event of setting the saw teeth, a simple design of the setting tool and a correspondingly simplified setting process is also possible.

The tooth supports with identical geometry have the same form or contour. The parameters determining the geometry of the tooth supports are identical, wherein different heights of the tooth supports, measured between a tooth tip and a tooth root—when seen in the transverse direction, that is to say orthogonally with respect to the longitudinal axis—are permissible as a result of different depths of tooth gap. With reference to a straight line placed along the tooth tips in the longitudinal direction of the saw blade and a straight line which is offset parallel in the direction of the tooth root and is guided through the tooth root at the smallest depth, in the case of at least two tooth supports, preferably in the case of the majority of all the tooth supports or in the case of all the tooth supports, there exists identity which also includes the height of the tooth supports.

The energy input is effected, as mentioned above, either by means of welding or brazing.

As disclosed in an advantageous design, it is provided that several saw teeth are combined to form one tooth group, wherein within one tooth group the pitch remains constant between the saw teeth and the pitch changes from one tooth group to the adjacent tooth group. Where the pitch is constant, both the geometry of the tooth supports and the tooth gaps remain identical, whereas when the pitch changes, the tooth support geometry or size may remain the same, but the tooth gaps change. As an alternative to this, it is also possible for increasing tooth gaps to be provided between several consecutive saw teeth such that the tooth pitch increases continuously from tooth to tooth. In addition, a combination of continuous tooth pitch and a division into identical groups is also possible, for example in such a manner that at least one tooth group is provided with the same type of saw teeth, to which connects a row of saw teeth with a continuous increase in the tooth pitch.

As disclosed in a further advantageous design, it is provided that at least the larger proportion of the saw teeth of the saw blade has tooth supports with identical geometry and size. In an advantageous manner, all the teeth of the saw blade are realized in such a manner.

As disclosed in a further expedient design, the space between the tooth root and the next tooth tip is identical in all the saw teeth. In an alternative design, the space is not identical over the length of the saw blade, but changes and in particular increases as the pitch increases.

As disclosed in a further expedient design, the geometry of the tooth gaps in the region of the tooth root is in the shape of a graduated circle, the radius increasing as the pitch increases. In an alternative design, the geometry of the tooth root can also not be in the shape of a graduated circle.

As disclosed in a further expedient design, the saw teeth are set, a non-set design also being possible in principle.

In addition, it can be expedient for the tooth supports adjacent to the tooth tip to have a tooth bed with a receiving surface for receiving the hard metal tooth. The hard metal tooth is joined to the tooth support in the region of the tooth bed, the surface of the tooth bed and/or the contour of the hard metal tooth being melted by means of the energy input. As disclosed in a first design, the receiving surface on the tooth bed, which serves for receiving the hard metal tooth, has a geometry in the shape of a graduated circle, which is adapted to the associated geometry of the hard metal tooth. In principle, however, as disclosed in an alternative design, a geometry of the receiving surface on the tooth bed which is not adapted to the outer contour of the hard metal tooth is also possible, for example a planar design of the receiving surface. The tooth bed is nevertheless adapted to the outer contour of the hard metal tooth by means of the melting.

The hacksaw, in which the saw blade is inserted, is, for example, a jigsaw or a reciprocating saw. In a corresponding manner, the saw blade is realized as a jigsaw blade or a reciprocating saw blade.

BRIEF DESCRIPTION OF THE DRAWINGS

Further advantages and expedient designs can be found in the further claims, the description of the figures and the drawings, in which:

FIG. 1 shows a saw blade with a plurality of saw teeth which have an increasing pitch from the clamping end to the saw blade tip, the saw teeth having a tooth support for receiving in each case one hard metal tooth, FIG. 2 shows an enlarged representation of the detail II from FIG. 1, FIG. 3 shows a detailed drawing of a hard metal tooth.

Identical components are provided with identical references in the figures.

DETAILED DESCRIPTION

FIG. 1 shows a saw blade 1 for a hacksaw realized as a reciprocating saw, the saw blade 1 having a blade support 2 with a plurality of saw teeth 11 which are arranged on one toothed side 3 and extend between a clamping end 5 and the saw blade tip 6. The saw blade 1 is clamped in the jigsaw at the clamping end 5. The saw teeth 11 consist in each case of a tooth support 4, which is realized in one piece with the blade support 2, and a separately realized hard metal tooth 13 (FIG. 3) which is joined in a fixed manner to the tooth support 4. FIG. 1 just shows the tooth supports 4 on the saw blade without the hard metal teeth.

The saw teeth 11 or the tooth supports 4 have an increasing pitch from the clamping end 5 to the saw blade tip 6. As can be seen in FIG. 1 in conjunction with FIG. 2, all the saw teeth 4 are realized in an identical manner with regard to their size and cross sectional geometry. The increasing pitch is achieved purely by means of increased tooth gaps between adjacent saw teeth 4. The tooth root 8 in each tooth gap 7 is in the shape of a graduated circle, as the pitch increases, the radius of the tooth root 8 in the shape of a graduated circle increases.

As can be seen in particular in FIG. 2, the space h between the tooth root 8 and the tooth tip 9 of each saw tooth 4 is constant for all the saw teeth. The angle α between the tooth breast 10, which is realized in a straight line, and a line parallel with respect to the longitudinal axis of the saw blade in the region of the tooth tip 9 of each tooth support 4 is at least approximately 50° in the exemplary embodiment. The angle β between the line parallel with respect to the longitudinal axis of the saw blade in the region of the tooth tip 9 and a tangent to the tooth tip is at least approximately 20°.

In FIGS. 1 and 2, the saw teeth 11 are just shown with the tooth supports 4. In the finished state, in addition to the tooth support 4, the saw teeth 11 also have a hard metal tooth 13 (FIG. 3) which is joined to the respective tooth support 4 by means of welding, in particular resistance welding, or brazing. A tooth bed 12, which is situated adjacent to the tooth tip 9 on the tooth rear side, includes a receiving surface 15 and is realized on each tooth support 4 for the joining to the hard metal tooth 13. The geometry of the tooth bed 12 is in the shape of a graduated circle which is adapted to the outer contour 14 of the hard metal tooth 13. However, it can also be expedient to realize the tooth bed 12 as a planar receiving surface instead of with a geometry in the shape of a graduated circle. Through the heating process during welding or soldering, the surface of the tooth support 4 in the region of the tooth bed 12 and/or the surface melts on the outer contour 14 of the hard metal tooth 13 such that different geometries of tooth bed 12 and hard metal tooth 13 are balanced out by soft material.

As can be seen in FIG. 3, the hard metal tooth 13 has side faces which converge in an angular manner in cross section and enclose an angle γ of at least approximately 60°.

The invention claimed is:

1. A saw blade, comprising:
a clamping end;
a saw blade tip; and
saw teeth arranged along a toothed side of the saw blade, the saw teeth having an increasing pitch from the clamping end to the saw blade tip,
wherein each of the saw teeth includes a tooth support and a hard metal tooth joined to the tooth support,
wherein several tooth supports have the same geometric size and shape, and
wherein the several tooth supports having the same geometric size and shape define larger tooth gaps therebetween for the increasing pitch.

2. The saw blade as claimed in claim 1, wherein several saw teeth are combined to form one tooth group, and wherein the saw teeth within the one tooth group have a constant pitch.

3. The saw blade as claimed in claim 1, wherein several consecutive saw teeth define increasing tooth gaps therebetween.

4. The saw blade as claimed in claim 1, wherein each of the saw teeth includes a tooth root and a tooth tip, and wherein a space between the tooth root and the tooth tip is identical in all the saw teeth.

5. The saw blade as claimed in claim 4, wherein the geometry of the tooth gaps in the region of the tooth root is in the shape of a graduated circle.

6. The saw blade as claimed in claim 1, wherein all the tooth supports have the same geometry.

7. The saw blade as claimed in claim 1, wherein the tooth supports adjacent to the tooth tip have a tooth bed with a receiving surface for receiving the hard metal tooth.

8. The saw blade as claimed in claim 7, wherein the receiving surface on the tooth bed has a geometry in the shape of a graduated circle.

9. The saw blade as claimed in claim 1, wherein the hard metal teeth are welded onto the tooth support.

10. The saw blade as claimed in claim 1, wherein the hard metal teeth are joined to the tooth support by brazing.

11. The saw blade as claimed in claim 1, further comprising:
a blade support.

12. The saw blade as claimed in claim 11, wherein the blade support includes the toothed side, on which the saw teeth are arranged.

13. The saw blade as claimed in claim 11, wherein the saw teeth are arranged between the clamping end of the saw blade and the saw blade tip.

14. The saw blade as claimed in claim 12, wherein each of the tooth supports is realized in one piece with the blade support.

15. The saw blade as claimed in claim 1, wherein a distance between a tooth root and a corresponding tooth tip of each of the saw teeth is constant.

* * * * *